United States Patent
Song et al.

(10) Patent No.: US 9,991,511 B2
(45) Date of Patent: Jun. 5, 2018

(54) COMPOSITE CATHODE ACTIVE MATERIAL, LITHIUM BATTERY INCLUDING THE SAME, AND METHOD OF PREPARING THE SAME

(71) Applicant: SAMSUNG SDI CO., LTD., Yongin-si, Gyeonggi-do (KR)

(72) Inventors: Yu-Mi Song, Yongin-si (KR); Ming-Zi Hong, Yongin-si (KR); Jeong-Hoon Kim, Yongin-si (KR); Do-Hyung Park, Yongin-si (KR); Min-Han Kim, Yongin-si (KR); Joong-Ho Moon, Yongin-si (KR); Han-Eol Park, Yongin-si (KR); Kyoung-Hyun Kim, Yongin-si (KR); Dong-Jin Kim, Yongin-si (KR); Jeon-Jin Choi, Yongin-si (KR); Gyu-Ran Jeon, Yongin-si (KR); Sun-Ho Kang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 497 days.

(21) Appl. No.: 14/659,383

(22) Filed: Mar. 16, 2015

(65) Prior Publication Data
US 2015/0340689 A1 Nov. 26, 2015

(30) Foreign Application Priority Data
May 21, 2014 (KR) .......................... 10-2014-0061160

(51) Int. Cl.
*H01M 4/36* (2006.01)
*H01M 4/58* (2010.01)
(Continued)

(52) U.S. Cl.
CPC ........... *H01M 4/366* (2013.01); *H01M 4/131* (2013.01); *H01M 4/1391* (2013.01);
(Continued)

(58) Field of Classification Search
CPC .... H01M 4/366; H01M 4/5825; H01M 4/525; H01M 4/131; H01M 4/485; H01M 10/052
See application file for complete search history.

(56) References Cited

U.S. PATENT DOCUMENTS

2010/0119943 A1* 5/2010 Lee ........................ H01M 4/485
429/220
2010/0310940 A1 12/2010 Kim et al.
(Continued)

FOREIGN PATENT DOCUMENTS

JP 2006019229 A * 1/2006
JP 2010-199078 A 9/2010
(Continued)

OTHER PUBLICATIONS

Patent Abstracts of Japan and Machine English Translation of JP 2010-199078 A, Sep. 9, 2010, 20 Pages.

*Primary Examiner* — Laura Weiner
(74) *Attorney, Agent, or Firm* — Lewis Roca Rothgerber Christie LLP (57) ABSTRACT

A composite cathode active material includes: a core including a material capable of intercalation and deintercalation of lithium; and a first coating layer on at least one portion of the core, where the first coating layer includes zirconium oxide. A lithium battery includes a cathode including the composite cathode active material. Methods of preparing the composite cathode active material are also disclosed.

9 Claims, 6 Drawing Sheets

(51) Int. Cl.
  *H01M 4/525*   (2010.01)
  *H01M 4/131*   (2010.01)
  *H01M 4/485*   (2010.01)
  *H01M 4/1391*  (2010.01)
  *H01M 4/62*    (2006.01)
  *H01M 10/052*  (2010.01)

(52) U.S. Cl.
  CPC ........... *H01M 4/485* (2013.01); *H01M 4/525* (2013.01); *H01M 4/5825* (2013.01); *H01M 4/62* (2013.01); *H01M 10/052* (2013.01)

(56) References Cited

U.S. PATENT DOCUMENTS

| | | | |
|---|---|---|---|
| 2013/0183579 A1* | 7/2013 | Kim | H01M 4/131 |
| | | | 429/206 |
| 2013/0302672 A1 | 11/2013 | Chang et al. | |
| 2014/0087233 A1 | 3/2014 | Hong | |
| 2014/0186678 A1* | 7/2014 | Kim | H01M 10/0562 |
| | | | 429/144 |
| 2015/0104708 A1* | 4/2015 | Bi | H01M 4/525 |
| | | | 429/220 |

FOREIGN PATENT DOCUMENTS

| | | | | |
|---|---|---|---|---|
| KR | 10-2010-0052116 A | 5/2010 | | |
| KR | 10-2012-0093775 A | 8/2012 | | |
| KR | 10-2012-0133288 A | 12/2012 | | |
| WO | WO-2013189109 A1 * | 12/2013 | ............ | H01M 4/525 |

* cited by examiner

COMPOSITE CATHODE ACTIVE MATERIAL, LITHIUM BATTERY INCLUDING THE SAME, AND METHOD OF PREPARING THE SAME

CROSS-REFERENCE TO RELATED APPLICATION

This application claims priority to and the benefit of Korean Patent Application No. 10-2014-0061160, filed on May 21, 2014, in the Korean Intellectual Property Office, the entire content of which is incorporated herein by reference.

BACKGROUND

1. Field

Aspects of one or more embodiments of the present invention are directed toward a composite cathode active material, a lithium battery including the same, and a method of preparing the composite cathode active material.

2. Description of the Related Art

Lithium batteries, for example, lithium ion batteries (LIBs), have been used (utilized) as a power source for portable electronic devices due to their high energy density and design efficiency. As lithium ion batteries have been used (utilized) as power sources of electronic vehicles or for power storage, in addition to portable electronic devices, recently, much research into materials for lithium ion batteries having high energy density or a long lifespan has been conducted.

Cathode active materials play very important roles in realizing lithium ion batteries having high energy density and/or a long lifespan. As such cathode active materials, Li—Co oxides, such as $LiCoO_2$, have been widely used (utilized).

However, maldistribution and scarcity of cobalt increases manufacturing costs of the Li—Co oxides, a stable supply of the Li—Co oxides cannot be guaranteed, and the Li—Co oxides provide relatively low discharge capacity.

Thus, Li—Ni—Co—Mn oxides or Li—Ni—Co—Al oxides have been used (utilized) as cathode active materials having high capacity and electrochemical stability. However, these oxides have a relatively short lifespan and unsatisfactory (or insufficient) electrochemical stability due to gas generation caused by remaining lithium.

Therefore, a cathode active material having excellent electrochemical stability, (high-temperature) lifespan characteristics, and high-temperature storage lifespan characteristics, a lithium battery including the same, and a method of preparing the cathode active material are desirable.

SUMMARY

One or more aspects of embodiments of the present invention are directed toward a composite cathode active material having excellent electrochemical stability, (high-temperature) lifespan characteristics, and high-temperature storage lifespan characteristics.

One or more aspects of embodiments of the present invention are directed toward a lithium battery including the composite cathode active material.

One or more aspects of embodiments of the present invention include a method of preparing a composite cathode active material having excellent electrochemical stability, (high-temperature) lifespan characteristics, and high-temperature storage lifespan characteristics.

Additional aspects will be set forth in part in the description which follows and, in part, will be apparent from the description, or may be learned by practice of the presented embodiments.

According to one or more embodiments of the present invention, a composite cathode active material includes: a core including a material capable of intercalation and deintercalation of lithium; and a first coating layer on at least one portion of the core, where the first coating layer includes zirconium oxide.

The composite cathode active material may further include a second coating layer, the second coating layer being between the core and the first coating layer, or being on the first coating layer.

The composite cathode active material may further include a second coating layer between the core and the first coating layer, wherein the second coating layer is formed from lithium remaining on the core.

The second coating layer may include lithium iron phosphate.

The core may include (e.g., be) a layer-structured lithium-transition metal oxide.

The core may include (e.g., be) a lithium-transition metal oxide represented by Formula 1:

$$Li_a(Ni_xCo_yMe_z)_{2-a}O_2 \qquad \text{Formula 1}$$

where $0.5 \le x \le 1$, $0 \le y \le 0.5$, $0 < z \le 0.5$, and $0.90 < a \le 1.20$, and Me is selected from the group consisting of aluminum (Al), manganese (Mn), titanium (Ti), and calcium (Ca).

The amount of lithium remaining on the core may be less than 0.50% by weight, based on the total weight of the composite cathode active material.

According to one or more embodiments of the present invention, a lithium battery includes: a cathode including a cathode active material; an anode including an anode active material; an electrolyte between the cathode and the anode, where the cathode active material includes the composite cathode active material.

According to one or more embodiments of the present invention, a method of preparing a composite cathode active material includes: preparing a core including a material capable of intercalation and deintercalation of lithium; and forming a first coating layer on at least one portion of the core by mixing the core with a zirconium oxide precursor to form a mixture and heat-treating the mixture.

According to one or more embodiments of the present invention, a method of preparing a composite cathode active material includes: preparing a core including a material capable of intercalation and deintercalation of lithium; forming a second coating layer on at least one portion of the core by mixing the core with an iron phosphate precursor to form a first mixture and performing a first heat-treatment of the first mixture; and forming a first coating layer on the second coating layer by mixing the core on which the second coating layer is formed (e.g., the core having the second coating layer) with a zirconium oxide precursor to form a second mixture and performing a second heat-treatment of the second mixture.

BRIEF DESCRIPTION OF THE DRAWINGS

These and/or other aspects will become apparent and more readily appreciated from the following description of certain embodiments, when considered together with the accompanying drawings in which.

DETAILED DESCRIPTION

Reference will now be made in detail to certain embodiments, examples of which are illustrated in the accompanying drawings, wherein like reference numerals refer to like elements throughout. In this regard, the present embodiments may have different forms and should not be construed as being limited to the descriptions set forth herein. Accordingly, certain embodiments are described below, by referring to the figures, merely to explain aspects of the present description. Expressions such as "at least one of," when preceding a list of elements, modify the entire list of elements and do not modify the individual elements of the list. Further, the use of "may" when describing embodiments of the present invention refers to "one or more embodiments of the present invention."

Hereinafter, embodiments of a composite cathode active material, a lithium battery including the same, and a method of preparing the composite cathode active material, will be described in more detail. The invention may, however, be embodied in many different forms and should not be construed as being limited to the embodiments set forth herein; rather, these embodiments are provided so that this disclosure will be thorough and complete, and will convey the concept of the invention to those of ordinary skill in the art.

According to an embodiment of the present invention, a composite cathode active material includes a core including a material that allows (e.g., is capable of) intercalation and deintercalation of lithium and a first coating layer on (e.g., formed on or directly on) at least one portion of the core. The first coating layer includes zirconium oxide.

Because the composite cathode active material includes the first coating layer on (e.g., formed on or directly on) at least one portion of the core, which includes the material that allows (e.g., is capable of) intercalation and deintercalation of lithium, and the first coating layer including the zirconium oxide, side reactions between the core and an electrolyte may be inhibited (or reduced), and thus lifespan characteristics may be improved. In addition, due to the improvement of electrochemical stability, the composite cathode active material may have improved lifespan characteristics and storage stability at a high temperature of 60° C. or greater.

The first coating layer may include zirconium oxide having a nano-sized average particle diameter (e.g., an average particle diameter less than 1 μm).

Figure 1A:
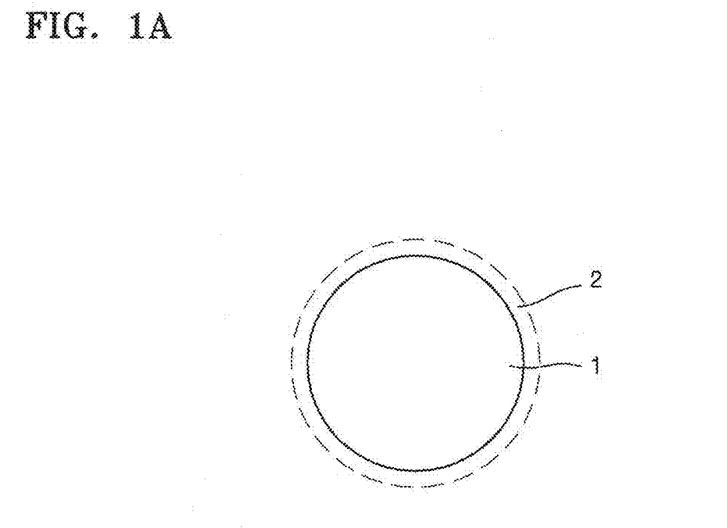
FIG. 1A is a schematic diagram of a composite cathode active material according to an embodiment of the present invention.

FIG. 1A is a schematic diagram of a composite cathode active material according to an embodiment of the present invention. Referring to FIG. 1A, the composite cathode active material includes a core 1 including a material that allows (e.g., is capable of) intercalation and deintercalation of lithium, and a first coating layer 2, in which zirconium oxide particles having a nano-sized average particle diameter (e.g., an average particle diameter less than 1 μm) are scattered, on (e.g., formed on or directly on) the core 1. Accordingly, a suitable (or appropriate) amount of the zirconium oxide is coated on the core, and thus capacity of the composite cathode active material including the first coating layer may be improved without (or substantially without) increasing surface resistance to an electrolyte.

The composite cathode active material may further include a second coating layer between (e.g., formed between) the core and the first coating layer or on (e.g., formed on or directly on) the first coating layer. The second coating layer may be further between (e.g., formed between) the core and the first coating layer and may be formed of (or formed from) lithium remaining on the core (e.g., residual lithium on a surface of the core). Lithium remaining (e.g., residual lithium) on the core may be derived from lithium compounds such as $Li_2CO_3$, LiOH, and $Li_2SO_4$.

Because the composite cathode active material includes the second coating layer between (e.g., formed between) the core and the first coating layer by using (utilizing) the remaining lithium on the core, the amount of lithium remaining on the core may be reduced and side reactions with an electrolyte may be inhibited (or reduced), thereby reducing generation of gas such as $CO_2$.

Figure 1B:
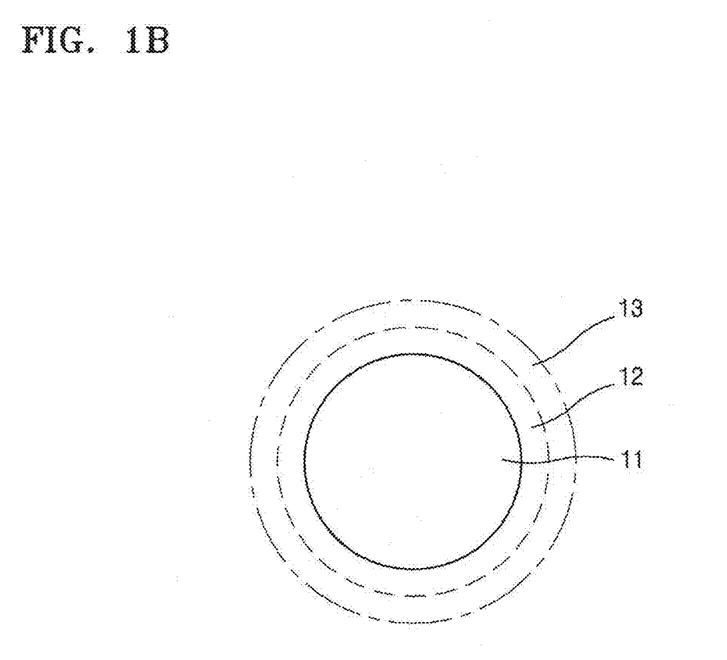
FIG. 1B is a schematic diagram of a composite cathode active material according to an embodiment of the present invention.

FIG. 1B is a schematic diagram of a composite cathode active material according to an embodiment of the present invention. Referring to FIG. 1B, the composite cathode active material includes a second coating layer 12 between a core 11 and a first coating layer 13.

The second coating layer may include lithium iron phosphate. The lithium iron phosphate may be formed by binding iron phosphate to lithium remaining on the core, thereby constituting the second coating layer. Accordingly, a composite cathode active material inhibiting (or reducing) gas generation and having excellent electrochemical stability may be on (e.g., formed on or directly on) the core.

The core may be a lithium-transition metal oxide having a layered structure. For example, the core may be a lithium-transition metal oxide represented by Formula 1.

$$Li_a(Ni_xCo_yMe_z)_{2-a}O_2$$  Formula 1

In Formula 0.5≤x≤1, 0≤y≤0.5, 0<z≤0.5, and 0.90<a≤1.20, and Me is selected from aluminum (Al), manganese (Mn), titanium (Ti), and calcium (Ca).

For example, the core may be $LiNi_pCo_qAl_rO_2$, where 0<p≤0.92 (e.g., 0.5≤p≤0.92 or 0.5<p≤0.92), 0<q≤0.2, and 0<r≤0.08. The core has high capacity and excellent electrochemical characteristics.

In the composite cathode active material, the amount of lithium remaining on the core may be less than 0.50% by weight, based on the total weight of the composite cathode active material. For example, the amount of lithium remaining on the core in the composite cathode active material may be less than 0.40% by weight, based on the total weight of the composite cathode active material. The composite cathode active material has excellent electrochemical stability.

A lithium battery according to another embodiment of the present invention includes a cathode including a cathode active material, an anode including an anode active material, and an electrolyte interposed between the cathode and the anode. The cathode active material may include the composite cathode active material as described above.

Figure 4:
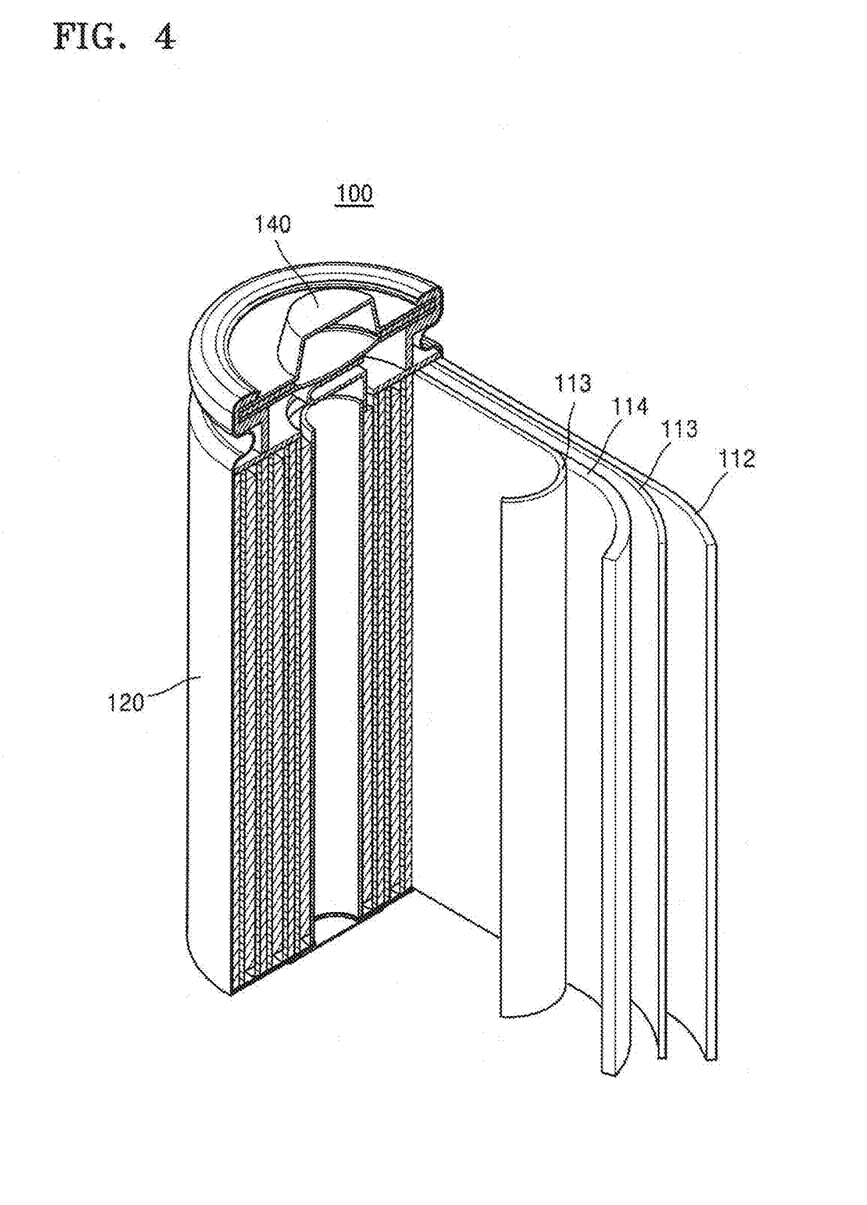
FIG. 4 is an exploded perspective view of a lithium battery according to an embodiment of the present invention.

FIG. 4 is an exploded perspective view of a lithium battery 100 according to an embodiment of the present invention. Although FIG. 4 illustrates a cylindrical battery, embodiments are not limited thereto. Any suitable lithium battery having a square pillar shape or pouch-type (or kind) lithium batteries may also be used (utilized).

Lithium batteries may be classified into lithium ion batteries, lithium ion polymer batteries, and lithium polymer batteries according to types (kinds) of a separator and an electrolyte. Lithium batteries may also be classified into a cylindrical type (kind), a rectangular type (kind), a coin type (kind), and a pouch type (kind) according to the shape of a battery, and may also be classified into a bulk type (kind) and a thin film type (kind) according to the size of a battery. The shape of a lithium battery according to an embodiment of the present invention is not particularly limited, and structures of lithium batteries and preparation methods thereof are well known in the art, and thus detailed descriptions thereof will not be given herein.

In more detail, referring to FIG. 4, the lithium battery 100 has a cylindrical shape. The lithium battery 100 includes an anode 112, a cathode 114, a separator 113 interposed between an anode 112 and a cathode 114, an electrolyte (impregnated into the anode 112, the cathode 114, and the separator 113), a battery case 120, and a sealing member 140 to seal the battery case 120. The lithium battery 100 is manufactured by sequentially stacking the anode 112, the separator 113, and the cathode 114 upon one another, winding the stack in a spiral form, and accommodating the wound stack in the battery case 120.

The anode 112 includes a current collector and an anode active material layer on (e.g., formed on or directly on) the current collector.

The current collector may be formed of stainless steel, nickel, aluminum, iron, copper, titanium, and the like, and may have a shape such as a thin film shape, a plate shape, a mesh (grid) shape, and a foam (sponge) shape, without being limited thereto.

The anode active material used (utilized) to form the anode active material layer may include lithium metal, a metal that is alloyable with lithium, a transition metal oxide, a material that allows (e.g., is capable of) doping or undoping of lithium, or a material that allows (e.g., is capable of) reversible intercalation and deintercalation of lithium ions.

Examples of the transition metal oxide may include vanadium oxide and lithium vanadium oxide. Examples of the material that allows (e.g., is capable of) doping or undoping of lithium may include, for example Si, $SiO_x$ ($0<x\leq2$), an Si—Y alloy, where Y is alkali metal, alkali earth metal, Group XIII-Group XVI elements, transition metal, rare earth elements, or any suitable combination thereof (except for Si), Sn, $SnO_2$, and an Sn—Y alloy, where Y is alkali metal, alkali earth metal, Group XIII-Group XVI elements, transition metal, rare earth elements, or any suitable combination thereof (except for Sn), where at least one of these materials may be used (utilized) in combination with $SiO_2$. In this regard, Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or any suitable combination thereof.

The material that allows (e.g., is capable of) reversible intercalation and deintercalation of lithium ions may be any suitable carbonaceous material that is a carbonaceous anode active material available in the art of lithium batteries. Examples of such carbonaceous materials may include crystalline carbon, amorphous carbon, and mixtures thereof. Examples of the crystalline carbon include natural graphite and artificial graphite that is in amorphous, plate, flake, spherical or fibrous form. Examples of the amorphous carbon include soft carbon (carbon sintered at low temperatures), hard carbon, meso-phase pitch carbides, sintered cork, and the like.

However, the anode active material is not limited thereto, and any suitable material capable of intercalating/deintercalating lithium and available in the art as an anode active material may also be used (utilized).

The anode 112 is prepared by preparing an anode active material composition by mixing an anode active material, a conductive agent, a binder, and a solvent, and preparing an anode plate by directly coating the anode active material composition on a Cu current collector. Alternatively, the anode active material composition is cast on a separate support, and then a film separated from the support is laminated on the Cu current collector to prepare an anode plate.

Examples of the conductive agent may include a carbonaceous material such as carbon black, graphitic microparticles, natural graphite, artificial graphite, acetylene black, Ketjen black, carbon fiber, and carbon nanotubes; a metal such as copper, nickel, aluminum, and silver, each of which may be used (utilized) in powder, fiber, or tube form; and conductive polymers such as polyphenylene derivatives, without being limited thereto. Any other suitable material available in the art as a conductive agent may also be used (utilized).

Examples of the binder may include a vinylidene fluoride/hexafluoropropylene copolymer, polyvinylidene fluoride (PVDF), polyacrylonitrile, polymethyl methacrylate, polytetrafluoroethylene (PTFE), mixtures thereof, and a styrene butadiene rubber polymer, without being limited thereto. Examples of the solvent may include N-methylpyrrolidone (NMP), acetone, water, and the like, without being limited thereto. Any suitable binder and any suitable solvent available in the art may also be used (utilized). The amounts of the anode active material, the conductive agent, the binder, and the solvent may be the same (or substantially the same) as those generally available in the art of lithium batteries. At least one selected from the group consisting of the conductive agent, the binder, and the solvent may not be used (utilized) according to the use (utilization) and structure of a lithium battery.

The cathode 114 includes a current collector and a cathode active material layer on (e.g., formed on or directly on) the current collector.

The current collector may include aluminum (Al) and have a thin film shape, a plate shape, a mesh (grid) shape, and a foam (sponge) shape, without being limited thereto.

The cathode active material constituting the cathode active material layer includes a composite cathode active material including a core, which includes a material allowing (e.g., that is capable of) intercalation and deintercalation of lithium, and a first coating layer, which is on (e.g., formed on or directly on) at least one portion of the core and includes zirconium oxide. The composite cathode active material may inhibit (or reduce) side reactions between the core and an electrolyte, thereby improving lifespan characteristics. In addition, due to the improvement of electrochemical stability, the composite cathode active material may have improved lifespan characteristics and storage lifespan characteristics at a high temperature of 60° C. or greater.

The composite cathode active material may further include a second coating layer between (e.g., formed between) the core and the first coating layer or on (e.g., formed on or directly on) the first coating layer.

The composite cathode active material may further include the second coating layer between the core and the first coating layer, and the second coating layer may be formed of (or formed from) lithium remaining on the core. The second coating layer may include lithium iron phosphate. Because the composite cathode active material includes the second coating layer between (e.g., formed between) the core and the first coating layer by using (utilizing) the remaining lithium, the amount of lithium remaining on the core may be reduced and side reactions with an electrolyte may be inhibited (or reduced), thereby reducing generation of gas such as $CO_2$. Thus, the electrochemical stability of the composite cathode active material may be improved.

Compositions of the first coating layer, the second coating layer, and the core are as described above, and thus descriptions thereof will not be given.

In the composite cathode active material, the amount of lithium remaining on the core may be less than 0.50% by weight, based on the total weight of the composite cathode active material. For example, the amount of lithium remaining on the core may be less than 0.40% by weight, based on the total weight of the composite cathode active material.

In addition to the composite cathode active material, the cathode active material may also include any suitable material available in the art. The cathode active material available in the art is not particularly limited, and any suitable material that allows (e.g., is capable of) reversible intercalation and deintercalation of lithium ions may be used (utilized). For example, at least one of the composite oxides of a metal, selected from the group consisting of Co, Mn, Ni, and any suitable combination thereof, and lithium may be used (utilized). Examples of the composite oxide may include a compound represented by one of $Li_aA_{1-b}B_bD_2$ ($0.90 \le a \le 1.8$ and $0 \le b \le 0.5$); $Li_aE_{1-b}B_bO_{2-c}D_c$ ($0.90 \le a \le 1.8$, $0 \le b \le 0.5$, and $0 \le c \le 0.05$); $LiE_{2-b}B_bO_{4-c}D_c$ ($0 \le b \le 0.5$ and $0 \le c \le 0.05$); $Li_aNi_{1-b-c}Co_bB_cD_\alpha$ ($0.90 \le a \le 1.8$, $0 \le b \le 0.5$, $0 \le c \le 0.05$, and $0 < \alpha \le 2$); $Li_aNi_{1-b-c}Co_bB_cO_{2-\alpha}F_\alpha$ ($0.90 \le a \le 1.8$, $0 \le b \le 0.5$, $0 \le c \le 0.05$, and $0 < \alpha < 2$); $Li_aNi_{1-b-c}Co_bB_cO_{2-\alpha}F_2$ ($0.90 \le a \le 1.8$, $0 \le b \le 0.5$, $0 \le c \le 0.05$, and $0 < \alpha < 2$); $Li_aNi_{1-b-c}Mn_bB_cD_\alpha$ ($0.90 \le a \le 1.8$, $0 \le b \le 0.5$, $0 \le c \le 0.05$, and $0 < \alpha \le 2$); $Li_aNi_{1-b-c}Mn_bB_cO_{2-\alpha}F_\alpha$ ($0.90 \le a \le 1.8$, $0 \le b \le 0.5$, $0 \le c \le 0.05$, and $0 < \alpha < 2$); $Li_aNi_{1-b-c}Mn_bB_cO_{2-\alpha}F_2$ ($0.90 \le a \le 1.8$, $0 \le b \le 0.5$, $0 \le c \le 0.05$, and $0 < \alpha < 2$); $Li_aNi_bE_cG_dO_2$ ($0.90 \le a \le 1.8$, $0 \le b \le 0.9$, $0 \le c \le 0.5$, and $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, and $0.001 \le e \le 0.1$); $Li_aNiG_bO_2$ ($0.90 \le a \le 1.8$ and $0.001 \le b \le 0.1$); $Li_aCoG_bO_2$ ($0.90 \le a \le 1.8$ and $0.001 \le b \le 0.1$); $Li_aMnG_bO_2$ ($0.90 \le a \le 1.8$ and $0.001 \le b \le 0.1$); $Li_aMn_2G_bO_4$ ($0.90 \le a \le 1.8$ and $0.001 \le b \le 0.1$); $LiQO_2$; $LiQS_2$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

Examples of the cathode active material available in the art may include $LiMn_2O_4$, $LiNi_2O_4$, $LiCoO_2$, $LiNiO_2$, $LiMnO_2$, $Li_2MnO_3$, $LiFePO_4$, $LiNi_xCo_yO_2$ ($0 < x \le 0.15$ and $0 < y \le 0.85$), $V_2O_5$, and TiS.

In the formulae above, A is selected from the group consisting of nickel (Ni), cobalt (Co), manganese (Mn), and combinations thereof; B is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; F is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

These compounds, on which a surface coating layer is formed, may be used (utilized) as the composite cathode active material, or any suitable mixture of one of these compounds and a compound having a coating layer may be used (utilized). The coating layer may include a compound of a coating element selected from an oxide, a hydroxide, an oxyhydroxide, an oxycarbonate, and a hydroxycarbonate of the coating element. The coating layer compounds may be amorphous or crystalline. A coating element contained in the coating layer may be Mg, Al, Co, K, Na, Ca, Si, Ti, V, Sn, Ge, Ga, B, As, Zr, or any suitable mixture thereof. A method of forming the coating layer may be any suitable coating method of these elements on the compound, which does not adversely affect physical properties of the cathode active material, for example, a spray coating method, an immersion method, and the like. This should be apparent to those of skill in the art, and thus a detailed description thereof will not be provided here.

The cathode active material layer may further include a conductive agent and a binder. In order to prepare the cathode active material layer, a composite cathode active material composition is prepared by mixing the composite cathode active material, the conductive agent, the binder, and a solvent. The composite cathode active material composition may be directly coated on an Al current collector and dried to prepare a cathode plate provided with the composite cathode active material layer. Alternatively, the cathode active material composition may be cast on a separate support, and then a film separated from the support is laminated on an Al current collector to prepare a cathode plate provided with the composite cathode active material layer. In this regard, the conductive agent, the binder, and the solvent contained in the cathode active material composition may be the same as those in the anode active material composition. The amounts of the composite cathode active material, the conductive agent, the binder, and the solvent may be the same (or substantially the same) as those generally available in the art of lithium batteries. At least one selected from the group consisting of the conductive agent, the binder, and the solvent may not be used (utilized) according to the use (utilization) and structure of a lithium battery.

If desired, a plasticizer may further be added to the cathode active material composition and the anode active material composition to form pores inside the electrode plates.

Any suitable separator available in the art may be used (utilized) as the separator 113. A separator having low resistance to migration of ions in the electrolyte and excellent electrolyte-retaining ability may be used (utilized). Examples of the separator 113 may include glass fiber, polyester, Teflon, polyethylene, polypropylene, polytetrafluoroethylene (PTFE), and a combination thereof, each of which may be a non-woven or woven fabric. For example, a windable separator, including polyethylene or polypropylene, may be used (utilized) in a lithium ion battery. A separator with excellent organic electrolyte solution retaining capability may be used (utilized) in a lithium ion polymer battery. For example, the separator 113 may be manufactured in the following manner:

A polymer resin, a filler, and a solvent are mixed to prepare a separator composition. Then, the separator composition may be coated (e.g., directly coated) on an electrode, and then dried to form a separator. Alternatively, the separator composition may be cast on a support and then dried to form a separator film, and the separator film, delaminated from the support, may be laminated on an electrode to form the separator.

The polymer resin used (utilized) to manufacture the separator may be any suitable material available as a binder for electrode plates. Examples of the polymer resin may include a vinylidene fluoride/hexafluoropropylene copolymer, PVDF, polyacrylonitrile, polymethyl methacrylate, and any suitable mixture thereof.

For example, the electrolyte may be an organic electrolyte. The organic electrolyte may be prepared by dissolving a lithium salt in an organic solvent.

The organic solvent may be any suitable organic solvent available in the art. Examples of the organic solvent include propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethyl sulfoxide, dioxane, 1,2-dimethoxyethane, sulforane, dichloroethane, chlorobenzene, nitrobenzene, diethylene glycol, dimethyl ether, and mixtures thereof.

The lithium salt may be any suitable lithium salt available in the art. Examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each independently a natural number), LiCl, LiI, and any suitable mixture thereof.

The lithium battery may be a large thin film battery. The lithium battery may be a lithium ion polymer battery. The separator 113 may be interposed between the cathode 114 and the anode 112 to form a battery assembly. The battery assembly may be stacked in a bi-cell structure and impregnated with an organic electrolyte. The resultant is put into a pouch and sealed, thereby completing the manufacture of a lithium ion polymer battery.

Alternatively, a plurality of battery assemblies may be stacked to form a battery pack, which may be used (utilized) in any suitable device that requires high capacity and high output, for example, in laptop computers, smartphones, electric vehicles, and the like.

The lithium battery may also be suitable for use (utilization) as power sources for electric vehicles (EVs) due to excellent electrochemical stability, (high-temperature) lifespan characteristics, and high-temperature storage lifespan characteristics. For example, the lithium battery may be applied to (or utilized in) hybrid electric vehicles such as plug-in hybrid electric vehicles (PHEVs).

According to another embodiment of the present invention, a method of preparing a composite cathode active material includes preparing a core including a material that allows (e.g., is capable of) intercalation and deintercalation of lithium, and forming a first coating layer on at least one portion of the core by mixing the core with a zirconium oxide precursor to form a mixture and heat-treating the mixture.

The core may be prepared by heat-treating a transition metal oxide precursor. For example, the core may be prepared in the following manner.

For example, first, the transition metal oxide precursor is prepared by preparing an aqueous solution of a transition metal salt or by co-precipitating a transition metal hydroxide and a base solution (e.g., a basic solution). The transition metal oxide precursor may be a sulfate, a nitride, an acetate, a halide, or a hydroxide of one selected from the group consisting of Ni, Co, Mn, Ca, Ti, and Al, or any suitable combination thereof.

The basic solution may be selected from an aqueous solution of $Na_2CO_3$, NaOH, KOH, $NH_4OH$, and any suitable combination thereof.

The transition metal oxide precursor may be prepared at a pH level of about 11 to about 13. When the pH is controlled within the range described above during preparation of the transition metal oxide precursor, a high-density co-precipitated transition metal oxide precursor may be obtained. In this regard, a reaction time may be in the range of about 7 to about 10 hours, and the reaction may be performed at a stirring rate of about 500 rpm to about 800 rpm. The stirring rate may be achieved utilizing any suitable mixer.

A lithium-transition metal oxide precursor prepared by mixing the co-precipitated transition metal oxide precursor and a lithium salt is heat-treated at a temperature of about 800° C. to about 1200° C. to prepare a core.

The lithium salt may include at least one selected from $Li_2CO_3$, $LiNO_3$, LiBr, LiCl, LiI, LiOH, $Li(CH_3CO_2)$, $LiH_2PO_4$, $LiOH.H_2O$, $Li(CH_3CO_2).2H_2O$, and any suitable combination thereof.

The core may be a lithium-transition metal oxide represented by Formula 1 below.

$$Li_a(Ni_xCo_yMe_z)_{2-a}O_2 \qquad \text{Formula 1}$$

In Formula 1, $0.5 \leq x \leq 1$, $0 \leq y \leq 0.5$, $0 < z \leq 0.5$, and $0.90 < a \leq 1.20$, and Me is selected from aluminum (Al), manganese (Mn), titanium (Ti), and calcium (Ca).

Then, the core is mixed with a zirconium oxide precursor to form the mixture, and the mixture is heat-treated to form a first coating layer on at least one portion of the core.

The method may further include washing the core after the preparing of the core. Here, the core may be washed once using (utilizing) water. For example, the washing may be performed by adding the prepared core to water, e.g., pure (or substantially pure) water (e.g., distilled or deionized water), precipitating the core while stirring for several tens of minutes, and filtering or drying a resultant supernatant. Remaining lithium (e.g., residual lithium that did not react with the transition metal oxide precursor) may be removed by the washing process. Although the capacity of the composite cathode active material including the core may be slightly reduced by the washing, the electrochemical stability of a lithium battery including the composite cathode active material may be improved by the washing.

Examples of the zirconium oxide precursor may include zirconium (IV) oxynitrate hydrate, zirconium (IV) acetylacetonate, zirconium acetate, zirconium (IV) iodide, zirconium (IV) fluoride, zirconium (IV) chloride, zirconium acrylate, zirconium carboxyethyl acrylate, zirconium nitride, zirconium (IV) silicate, a zirconium (IV) propoxide solution, zirconium (IV) oxychloride octahydrate, a zirconium (IV) butoxide solution, zirconium (IV) tert-butoxide, zirconium (IV) hydroxide, zirconium (IV) ethoxide, and zirconium (IV) hydrogen phosphate.

The amount of the zirconium oxide precursor may be in the range of about 0.01 mol % to about 2.0 mol %, based on 1 mol of the core. For example, the amount of the zirconium oxide precursor may be in the range of about 0.05 mol % to about 1.0 mol %, based on 1 mol of the core. For example, the amount of the zirconium oxide precursor may be in the range of about 0.1 mol % to about 0.5 mol %, based on 1 mol of the core.

The heat-treatment (e.g., the heat-treating) may be performed at a temperature of about 650° C. to about 950° C. For example, the heat-treatment may be performed at a temperature of about 650° C. to about 900° C. When the heat-treatment (heat-treating) is performed within any of the temperature ranges as described above, a first coating layer, including a suitable (or appropriate) amount of the zirconium oxide, may be on (e.g., formed on or directly on) the core.

According to another embodiment of the present invention, a method of preparing a composite cathode active material includes: preparing a core including a material that allows (e.g., is capable of) intercalation and deintercalation of lithium; forming a second coating layer on at least one portion of the core by mixing the core with an iron phosphate precursor to form a first mixture and performing a first heat-treatment (e.g., a first heat-treating) of the first mixture; and forming a first coating layer on the second coating layer by mixing the core on which the second coating layer is formed (e.g., the core having the second coating layer) with a zirconium oxide precursor to form a second mixture and performing a second heat-treatment (e.g., a second heat-treating) of the second mixture.

The second coating layer may be formed, in part, from lithium remaining on the core (e.g., residual lithium that did not react with the transition metal oxide precursor). The second coating layer may include lithium iron phosphate. For example, the second coating layer may include a reaction product of at least a portion of the lithium remaining on the core and the iron phosphate precursor.

Examples of the iron phosphate precursor may include iron (III) nitrate nonahydrate ($Fe(NO_3)_3 \cdot 9H_2O$) and ferric phosphate dihydrate ($FePO_4 \cdot 2H_2O$).

The amount of the iron phosphate precursor may be in the range of about 0.01 mol % to about 2.0 mol %, based on 1 mol of the core. For example, the amount of the iron phosphate precursor may be in the range of about 0.05 mol % to about 1.0 mol %, based on 1 mol of the core. For example, the amount of the iron phosphate precursor may be in the range of about 0.1 mol % to about 0.5 mol %, based on 1 mol of the core. Accordingly, a composite cathode active material inhibiting (or reducing) gas generation on (or at) the core and having excellent electrochemical stability may be formed.

The type (e.g., composition) and amount of the zirconium oxide precursor are as described above, and thus a description thereof will not be repeated here.

The first or second heat-treatment may be performed at a temperature of about 650° C. to about 950° C. For example, the first or second heat-treatment may be performed at a temperature of about 650° C. to about 900° C. When the first and second heat-treatments are performed within the temperature range as described above, a second coating layer, including a suitable (or appropriate) amount of lithium iron phosphate, and a first coating layer, including a suitable (or appropriate) amount of zirconium oxide, may be sequentially formed on the core.

Hereinafter, one or more embodiments of the present invention will be described in more detail with reference to the following examples. These examples are not intended to limit the purpose and scope of the one or more embodiments of the present invention.

In addition, descriptions that are not given herein should be apparent to one of ordinary skill in the art, and thus detailed descriptions thereof will not be provided here.

EXAMPLES

Preparation of Composite Cathode Active Material

Example 1: Preparation of Composite Cathode Active Material

Nickel sulfate ($NiSO_4$, Aldrich Co.), cobalt sulfate ($CoSO_4$, Aldrich Co.), and aluminum sulfate ($Al_2(SO_4)_3$, Aldrich Co.) were mixed such that a molar ratio of Ni, Co, and Al was 84:15:1, and pure (or substantially pure) water was added thereto to prepare a 2.4 M aqueous solution. A 7.5 M NaOH aqueous solution and a 15 M $NH_4OH$ solution were added to the 2.4 M aqueous solution, and the solution was continuously mixed in a co-precipitation device. The resultant mixture was subjected to co-precipitation at a pH of 11 at 40° C. for 8 hours at 700 rpm to prepare a $Ni_{0.84}Co_{0.15}Al_{0.01}(OH)_2$ precursor. The obtained $Ni_{0.84}CO_{0.15}Al_{0.01}(OH)_2$ precursor was washed several times with water and dried in an oven at 120° C. The dried $Ni_{0.84}Co_{0.15}Al_{0.01}(OH)_2$ precursor was filtered, and the filtered $Ni_{0.84}Co_{0.15}Al_{0.01}(OH)_2$ precursor was mixed with $Li_2CO_3$ (Aldrich Co.) in a molar ratio of about 1:1 by using (utilizing) a simple mixer. The mixture collected therefrom was added to a crucible and heat-treated under atmospheric conditions for 10 hours by heating at a rate of 2° C./min to a maximum temperature of 900° C. to prepare a $LiNi_{0.84}Co_{0.15}Al_{0.01}O_2$ core. The prepared $LiNi_{0.84}CO_{0.15}Al_{0.01}O_2$ core was washed once by adding the $LiNi_{0.84}Co_{0.15}Al_{0.01}O_2$ core to pure (or substantially pure) water, stirring the resultant for 10 minutes to precipitate the $LiNi_{0.84}Co_{0.15}Al_{0.01}O_2$ core, and filtering a resultant supernatant.

Then, 0.25 mol % of zirconium (IV) oxynitrate hydrate ($ZrO(NO_3)_2 \cdot xH_2O$, (Aldrich Co.) having an average particle diameter less than 1 μm was mixed with 1 mol of the $LiNi_{0.84}CO_{0.15}Al_{0.01}O_2$ core, based on 1 mol of the $LiNi_{0.84}CO_{0.15}Al_{0.01}O_2$ core, to form a mixture and the mixture was heat-treated at 700° C. for 5 hours to prepare a composite cathode active material in which a first coating layer, including zirconium oxide, is formed on the $LiNi_{0.84}CO_{0.15}Al_{0.01}O_2$ core.

Example 2: Preparation of Composite Cathode Active Material

Nickel sulfate ($NiSO_4$, Aldrich Co.), cobalt sulfate ($CoSO_4$, Aldrich Co.), and aluminum sulfate ($Al_2(SO_4)_3$, Aldrich Co.) were mixed such that a molar ratio of Ni, Co, and Al was 84:15:1, and pure (or substantially pure) water was added thereto to prepare a 2.4 M aqueous solution. A 7.5 M NaOH aqueous solution and a 15 M $NH_4OH$ solution were added to the 2.4 M aqueous solution, and the solution was continuously mixed in a co-precipitation device. The resultant mixture was subjected to co-precipitation at a pH of 11 at 40° C. for 8 hours at 700 rpm to prepare a $Ni_{0.84}Co_{0.15}Al_{0.01}(OH)_2$ precursor. The obtained $Ni_{0.84}Co_{0.15}Al_{0.01}(OH)_2$ precursor was washed several times with water and dried in an oven at 120° C. The dried $Ni_{0.84}Co_{0.15}Al_{0.01}(OH)_2$ precursor was filtered, and the filtered $Ni_{0.84}Co_{0.15}Al_{0.01}(OH)_2$ precursor was mixed with $Li_2CO_3$ (Aldrich Co.) in a molar ratio of about 1:1 by using (utilizing) a simple mixer. The mixture collected therefrom was added to a crucible and heat-treated under atmospheric conditions for 10 hours by heating at a rate of 2° C./min to a maximum temperature 900° C. to prepare a $LiNi_{0.84}Co_{0.15}Al_{0.01}O_2$ core.

Then, 0.25 mol % of ammonium phosphate $(NH_4)_2HPO_4$, (Aldrich Co.) having an average particle diameter less than 1 μm and 0.25 ml % of iron (III) nitrate nonahydrate $(Fe(NO_3)_3.9H_2O)$ were mixed with the $LiNi_{0.84}CO_{0.15}Al_{0.01}O_2$ core, based on 1 mol of the core, to form a first mixture and the mixture was heat-treated (a first heat-treatment was performed) at 700° C. for 5 hours to form a second coating layer, including lithium iron phosphate, on the $LiNi_{0.84}Co_{0.15}Al_{0.01}O_2$ core.

Then, 0.25 mol % of zirconium (IV) oxynitrate hydrate $(ZrO(NO_3)_2.xH_2O.$ (Aldrich Co.) having an average particle diameter less than 1 μm was mixed with the core on which the second coating layer, including lithium iron phosphate, is formed (the core having the second coating layer including lithium iron phosphate), based on 1 mol of the core, to form a second mixture and the second mixture was heat-treated (a second heat-treatment was performed) at 700° C. for 5 hours to prepare a composite cathode active material in which a first coating layer, including zirconium oxide, is formed on the $LiNi_{0.84}CO_{0.15}Al_{0.01}O_2$ core.

Comparative Example 1: Preparation of Cathode Active Material

Nickel sulfate ($NiSO_4$, Aldrich Co.), cobalt sulfate ($CoSO_4$, Aldrich Co.), and aluminum sulfate ($Al_2(SO_4)_3$, Aldrich Co.) were mixed such that a molar ratio of Ni, Co, and Al was 84:15:1, and pure (or substantially pure) water was added thereto to prepare a 2.4 M aqueous solution. A 7.5 M NaOH aqueous solution and a 15 M $NH_4OH$ solution were added to the 2.4 M aqueous solution, and the solution was continuously mixed in a co-precipitation device. The resultant mixture was subjected to co-precipitation at a pH of 11 at 40° C. for 8 hours at 700 rpm to prepare a $Ni_{0.84}Co_{0.15}Al_{0.01}(OH)_2$ precursor. The obtained $Ni_{0.84}CO_{0.15}Al_{0.01}(OH)_2$ precursor was washed several times with water and dried in an oven at 120° C. The dried $Ni_{0.84}Co_{0.15}Al_{0.01}(OH)_2$ precursor was filtered, and the filtered $Ni_{0.84}CO_{0.15}Al_{0.01}(OH)_2$ precursor was mixed with $Li_2CO_3$ (Aldrich Co.) in a molar ratio of about 1:1 by using (utilizing) a simple mixer. The mixture collected therefrom was added to a crucible and heat-treated under atmospheric conditions for 10 hours by heating at a rate of 2° C./min to a maximum temperature of 900° C. to prepare a $LiNi_{0.84}Co_{0.15}Al_{0.01}O_2$ cathode active material.

Comparative Example 2: Preparation of Composite Cathode Active Material

Nickel sulfate ($NiSO_4$, Aldrich Co.), cobalt sulfate ($CoSO_4$, Aldrich Co.), and aluminum sulfate ($Al_2(SO_4)_3$, Aldrich Co.) were mixed such that a molar ratio of Ni, Co, and Al was 84:15:1, and pure (or substantially pure) water was added thereto to prepare a 2.4 M aqueous solution. A 7.5 M NaOH aqueous solution and a 15 M $NH_4OH$ solution were added to the 2.4 M aqueous solution, and the solution was continuously mixed in a co-precipitation device. The resultant mixture was subjected to co-precipitation at a pH of 11 at 40° C. for 8 hours at 700 rpm to prepare a $Ni_{0.84}Co_{0.15}Al_{0.01}(OH)_2$ precursor. The obtained $Ni_{0.84}CO_{0.15}Al_{0.01}(OH)_2$ precursor was washed several times with water and dried in an oven at 120° C. The dried $Ni_{0.84}Co_{0.15}Al_{0.01}(OH)_2$ precursor was filtered, and the filtered $Ni_{0.84}CO_{0.15}Al_{0.01}(OH)_2$ precursor was mixed with $Li_2CO_3$ (Aldrich Co.) in a molar ratio of about 1:1 by using (utilizing) a simple mixer. The mixture collected therefrom was added to a crucible and heat-treated under atmospheric conditions for 10 hours at a rate of 2° C./min to a maximum temperature of 900° C. to prepare a $LiNi_{0.84}Co_{0.15}Al_{0.01}O_2$ core. The prepared $LiNi_{0.84}CO_{0.15}Al_{0.01}O_2$ core was washed once by adding the $LiNi_{0.84}Co_{0.15}Al_{0.01}O_2$ core to pure (or substantially pure) water, stirring the resultant for 10 minutes to precipitate the $LiNi_{0.84}CO_{0.15}Al_{0.01}O_2$ core, and filtering a resultant supernatant.

Then, 0.25 mol % of aluminum powder having an average particle diameter less than 1 μm was mixed with the $LiNi_{0.84}Co_{0.15}Al_{0.01}O_2$ core, based on 1 mol of the core, to form a mixture and the mixture was heat-treated at 700° C. for 5 hours to prepare a composite cathode active material in which a first coating layer, including aluminum, is formed on the $LiNi_{0.84}CO_{0.15}Al_{0.01}O_2$ core.

Comparative Example 3: Preparation of Cathode Active Material

A $LiNi_{0.878}Co_{0.108}Al_{0.014}O_2$ (Ecopro Ltd.) cathode active material was obtained.

Comparative Example 4: Preparation of Cathode Active Material

Nickel sulfate ($NiSO_4$, Aldrich Co.), cobalt sulfate ($CoSO_4$, Aldrich Co.), and aluminum sulfate ($Al_2(SO_4)_3$, Aldrich Co.) were mixed such that a molar ratio of Ni, Co, and Al was 84:15:1, and pure (or substantially pure) water was added thereto to prepare a 2.4 M aqueous solution. A 7.5 M NaOH aqueous solution and a 15 M $NH_4OH$ solution were added to the 2.4 M aqueous solution, and the solution was continuously mixed in a co-precipitation device. The resultant mixture was subjected to co-precipitation at a pH of 11 at 40° C. for 8 hours at 700 rpm to prepare a $Ni_{0.84}Co_{0.15}Al_{0.01}(OH)_2$ precursor. The obtained $Ni_{0.84}CO_{0.15}Al_{0.01}(OH)_2$ precursor was washed several times with water and dried in an oven at 120° C. The dried $Ni_{0.84}Co_{0.15}Al_{0.01}(OH)_2$ precursor was mixed with zirconium oxide powder at a molar ratio of 100:0.25. The resultant was mixed by using (utilizing) a simple mixer such that a molar ratio of the total number of moles of Ni, Co, Al, and Zr to the number of moles of $Li_2CO_3$ (Aldrich Co.) was about 1:1. The mixture collected therefrom was added to a crucible and heat-treated under atmospheric conditions for 10 hours at a rate of 2° C./min to a maximum temperature of 900° C., and the resultant was washed once by adding the resultant to pure (or substantially pure) water, stirring the resultant for 10 minutes to precipitate an $Li(Ni_{0.839}Co_{0.1485}Al_{0.01}Zr_{0.0025})O_2$ core, and filtering a resultant supernatant.

Then, the washed mixture was added to a crucible and heat-treated under atmospheric conditions for 5 hours by heating at a rate of 2° C./min to a maximum temperature of 700° C. to prepare $Li(Ni_{0.839}Co_{0.1485}Al_{0.01}Zr_{0.0025})O_2$ as a cathode active material.

Comparative Example 5: Preparation of Cathode Active Material

Nickel sulfate (NiSO$_4$, Aldrich Co.), cobalt sulfate (CoSO$_4$, Aldrich Co.), and aluminum sulfate (Al$_2$(SO$_4$)$_3$, Aldrich Co.) were mixed such that a molar ratio of Ni, Co, and Al was 84:15:1, and pure (or substantially pure) water was added thereto to prepare a 2.4 M aqueous solution. A 7.5 M NaOH aqueous solution and a 15 M NH$_4$OH solution were added to the 2.4 M aqueous solution, and the solution was continuously mixed in a co-precipitation device. The resultant mixture was subjected to co-precipitation at a pH of 11 at 40° C. for 8 hours at 700 rpm to prepare a Ni$_{0.84}$Co$_{0.15}$Al$_{0.01}$(OH)$_2$ precursor. The obtained Ni$_{0.84}$Co$_{0.15}$Al$_{0.01}$(OH)$_2$ precursor was washed several times with water and dried in an oven at 120° C. The dried Ni$_{0.84}$Co$_{0.15}$Al$_{0.01}$(OH)$_2$ precursor was filtered, and the filtered Ni$_{0.84}$CO$_{0.15}$Al$_{0.01}$(OH)$_2$ precursor was mixed with Li$_2$CO$_3$ (Aldrich Co.) in a molar ratio of about 1:1 by using (utilizing) a simple mixer. The mixture collected therefrom was added to a crucible and heat-treated under atmospheric conditions for 10 hours by heating at a rate of 2° C./min to a maximum temperature of 900° C. to prepare a LiNi$_{0.84}$Co$_{0.15}$Al$_{0.01}$O$_2$ core. The prepared LiNi$_{0.84}$Co$_{0.15}$Al$_{0.01}$O$_2$ core was washed once by adding the LiNi$_{0.84}$CO$_{0.15}$Al$_{0.01}$O$_2$ core to pure (or substantially pure) water, stirring the resultant for 10 minutes to precipitate the LiNi$_{0.84}$Co$_{0.15}$Al$_{0.01}$O$_2$ core, and filtering a resultant supernatant.

Then, 0.25 mol % of zirconium (IV) oxide (ZrO$_2$, Aldrich Co.) having an average particle diameter less than 1 μm and 0.25 mol % of ferric phosphate dehydrate (FePO$_4$.2H$_2$O, Aldrich Co.) were mixed with the LiNi$_{0.84}$Co$_{0.15}$Al$_{0.01}$O$_2$ core, based on 1 mol of the core, to form a mixture and the mixture was heat-treated at 700° C. for 5 hours to prepare Li(Ni$_{0.838}$Co$_{0.147}$Al$_{0.01}$Zr$_{0.0025}$Fe$_{0.0025}$)O$_2$ as a cathode active material.

Preparation of Lithium Battery

Example 3: Preparation of Lithium Battery

A composite cathode active material powder prepared as in Example 1 and a carbon conductive agent (denka black) were mixed and a pyrrolidone solution, including a PVDF binder, was added thereto to prepare a slurry in which a weight ratio of the active material:carbon conductive agent:binder was 92:4:4.

The slurry was coated on a 15 μm-thick Al foil by bar coating to a thickness of about 40 to about 50 μm and dried. The dried slurry was further dried in a vacuum (under vacuum) at 110° C. to prepare a cathode plate. The cathode plate was pressed using (utilizing) a roll press to prepare a cathode for a coin cell having a sheet-type (e.g., a cathode having a shape of a sheet).

A coin half-cell was prepared using (utilizing) the cathode, a graphite anode having a diameter of 1.6 cm, and an electrolyte prepared by dissolving 1.3 M LiPF$_6$ lithium salt in a mixture including ethylene carbonate, diethyl carbonate, and ethyl methyl carbonate (EC/DEC/EMC) in a volume ratio of 3:4:3.

Example 4: Preparation of Lithium Battery

Coin half cells were prepared as in Example 3, except that a composite cathode active material prepared as in Example 2 was used (utilized) instead of the composite cathode active material prepared as in Example 1.

Comparative Examples 6 to 10: Preparation of Lithium Battery

Coin half cells were prepared as in Example 3, except that a cathode active material or composite cathode active material prepared as in one of Comparative Examples 1 to 5 was used (utilized) in each of the coin half cells instead of the composite cathode active material prepared as in Example 1.

Surface Analysis of Composite Cathode Active Material

Analysis Example 1: Observing Surface of Composite Cathode Active Material—Scanning Electron Microscopic (SEM) Image and Transmission Electron Microscopic (TEM) Image The surface of the composite cathode active material prepared as in Example 2 was observed using (utilizing) a scanning electron microscope (SEM, HITCHI, Model no.: S-3500). The results are shown in FIG. 2.

Figure 2:
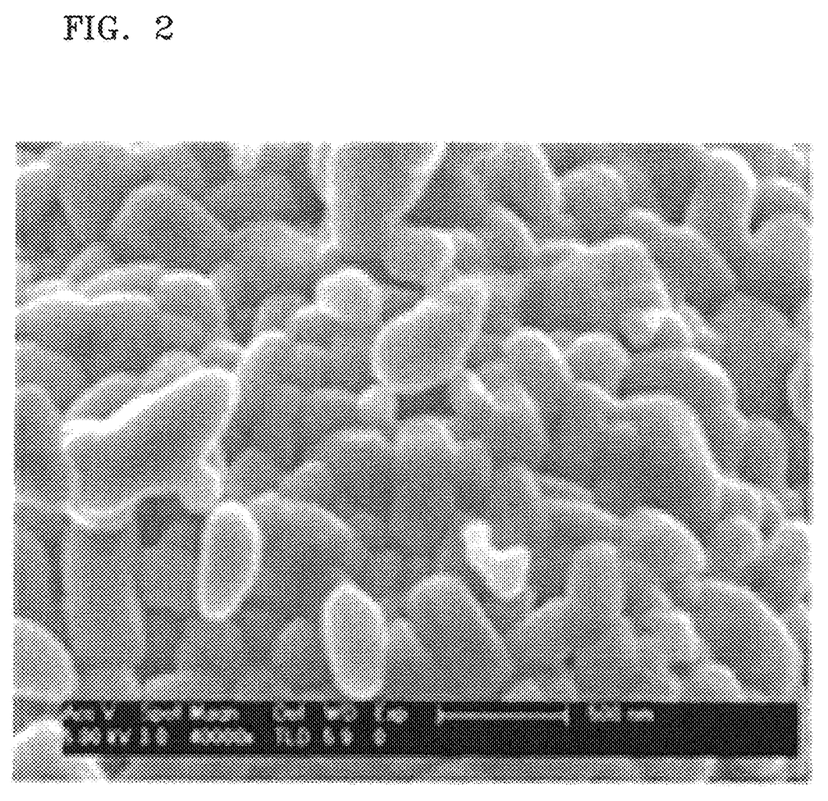
FIG. 2 is a scanning electron microscopic (SEM) image of a surface of a composite cathode active material prepared according to Example 2.

Referring to FIG. 2, it is confirmed that a first coating layer, including ZrO$_2$ particles having an average particle diameter of about 400 nm, which are shown as white regions, and a second coating layer, including LiFePO$_4$ particles, are formed on surfaces of the composite cathode active material prepared as in Example 2.

In addition, the surfaces of the composite cathode active materials prepared as in Examples 1 and 2 were observed using (utilizing) a transmission electron microscope (TEM, JEOL, Model No.: JEM-100CXII). The results are shown in FIG. 3A (Example 1) and FIG. 3B (Example 2).

Figure 3A:
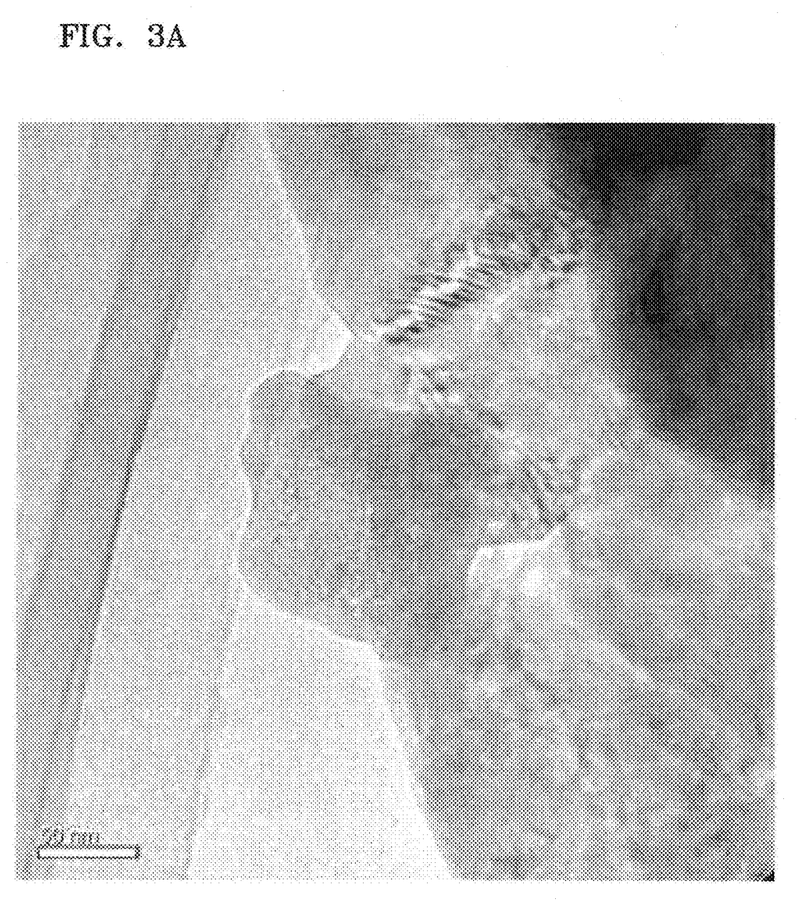
FIG. 3A is a transmission electron microscopic (TEM) image of a surface of a composite cathode active material prepared according to Example 1.
Figure 3B:
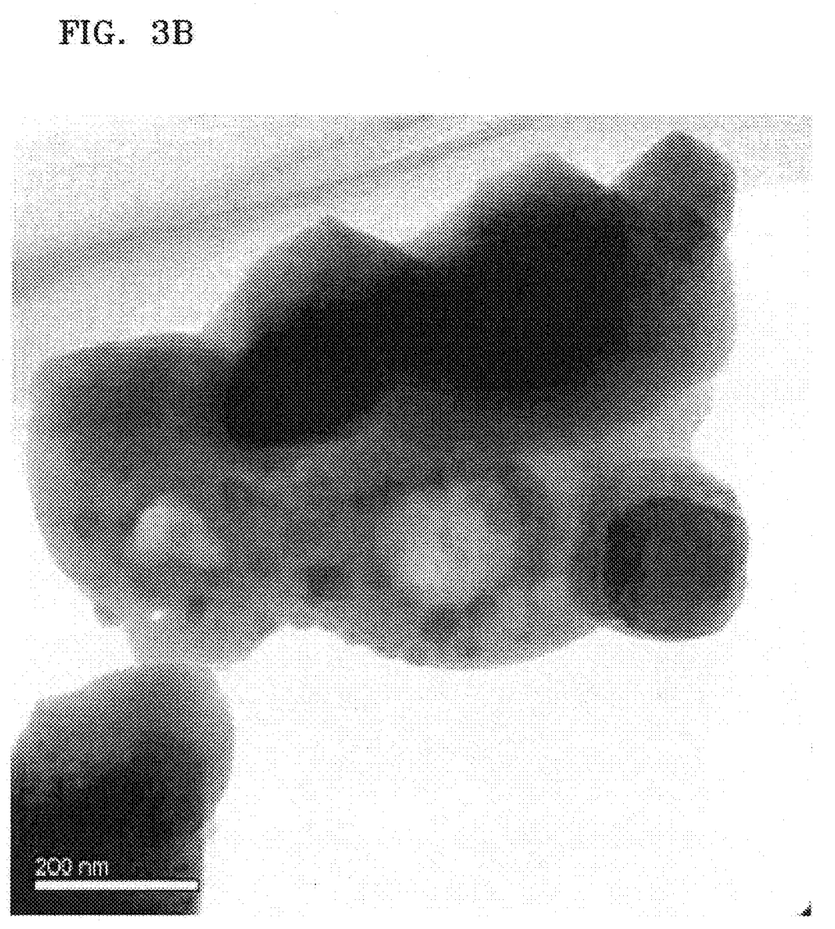
FIG. 3B is a TEM image of the surface of a composite cathode active material prepared according to Example 2.

Referring to FIG. 3A, it is confirmed that a coating layer, including zirconium oxide particles, which appear in FIG. 3A as dots, is formed on a surface of the composite cathode active material prepared as in Example 1. Referring to FIG. 3B, it is also confirmed that a second coating layer, including lithium iron phosphate, which appears in FIG. 3B as black dots, and a first coating layer, including zirconium oxide particles, which appear in FIG. 3B as dots, is formed on a surface of the composite cathode active material prepared as in Example 2.

Analysis Example 2: Surface Analysis of Composite Cathode Active Material—Inductively Coupled Plasma (ICP) Analysis A sample was collected from the surface of the composite cathode active material prepared as in Example 2, and a sample solution was prepared by adding pure (or substantially pure) water to the sample. The sample solution was subjected to ICP analysis, and molarities (mg/L) of Fe, P, and Zr, respectively, were measured. The results are shown in Table 1 below. In this regard, the instrument used (utilized) in the ICP analysis was an ICPS-8100 (Shimadzu Corp.).

TABLE 1

| | Molarity of Fe (mg/L) | Molarity of P (mg/L) | Molarity of Zr (mg/L) |
|---|---|---|---|
| Example 2 | 640 | 706 | 1501 |

Referring to Table 1, it is confirmed that a coating layer of lithium iron phosphate and zirconium oxide is formed on the surface of the composite cathode active material prepared according to Example 2. In addition, a ratio of a total molarity of Fe and P to that of Zr was about 1:1.12, which is nearly 1:1 (or substantially 1:1).

Analysis Example 3: Analysis of Amount of Lithium Remaining on Surface of Core of (Composite) Cathode Active Material 30 g of each of the composite cathode active materials prepared as in Examples 1 and 2 and the cathode active material prepared as in Comparative Example 1 was mixed with 100 g of distilled water in a container including a magnetic bar, and then the resultant mixture was stirred for 30 minutes to obtain a solution. The solution was subjected to pH titration while adding a 0.1 N HCl solution to the solution and the pH titration was terminated when the pH reached a value less than 3. Here, a flow rate was controlled such that the pH titration was conducted over a time period of about 20 to 30 minutes.

Here, the amounts of $Li_2CO_3$ and LiOH remaining (e.g., residual lithium) on the surfaces of the composite cathode active materials prepared as in Examples 1 and 2 and on the surface of the cathode active material prepared as in Comparative Example 1 were measured and calculated using (utilizing) Equation 1 below, thereby obtaining the amount of lithium remaining on each of the surfaces of the composite cathode active materials prepared as in Examples 1 and 2 and on the surface of the cathode active material prepared as in Comparative Example 1. The results are shown in Table 2.

Amount of residual lithium (% by weight)=[amount of $Li_2CO_3$X(molecular weight of Li/molecular weight of $Li_2CO_3$)+amount of LiOH X(molecular weight of Li/molecular weight of LiOH)]   Equation 1

TABLE 2

|  | $Li_2CO_3$ (% by weight) | LiOH (% by weight) | Amount of residual lithium (% by weight) |
|---|---|---|---|
| Example 1 | 1.35 | 0.65 | 0.44 |
| Example 2 | 1.13 | 0.57 | 0.38 |
| Comparative Example 1 | 3.35 | 1.01 | 0.92 |

Referring to Table 2, the amount of lithium remaining (e.g., residual lithium) on the surface of each of the composite cathode active materials prepared as in Examples 1 and 2 was less than that of lithium remaining (e.g., residual lithium) on the surface of the cathode active material prepared as in Comparative Example 1. Furthermore, it is confirmed that the amounts of lithium remaining (residual lithium) on the surfaces of each of the composite cathode active materials prepared as in Examples 1 and 2 were respectively less than 0.50% by weight and less than 0.40% by weight, based on the total weight of the composite cathode active material.

Evaluation of Performance of Lithium Battery

Evaluation Example 1: Evaluation of Lifespan Characteristics

Coin half cells prepared as in Examples 3 and 4 and Comparative Example 6 were subjected to two cycles of charging and discharging at room temperature to perform a formation. In a first operation of the formation, the coin half cells were charged (constant current charged) at a rate of 0.1 C until the voltage reached 4.3 V. Then, the coin half cells were discharged (constant current discharged) at a rate of 0.1 C until the voltage reached 2.8 V.

After the formation, each battery was charged as described above at a rate of 0.5 C and discharged at a rate of 0.2 C until the voltage reached 2.8 V. These charging and discharging conditions were used (utilized) as reference conditions for charging and discharging, and a discharge capacity was measured and used (utilized) as a reference capacity.

Then, each battery was charged as described above at a rate of 1 C and discharged at a rate of 1 C until the voltage reached 2.8 V. Then, a discharge capacity (at a $1^{st}$ cycle) was measured. Charging and discharging were repeated as described above to respectively measure discharge capacities at each cycle and at a $30^{th}$ cycle. Discharge capacities per weight were obtained therefrom and respective capacity retention rates were calculated to evaluate lifespan characteristics of the coin half cells according to Examples 3 and 4 and Comparative Example 6. The results are shown in Table 3 and FIG. 5. Here, the capacity retention rate (%) is obtained using (utilizing) Equation 2.

Figure 5:
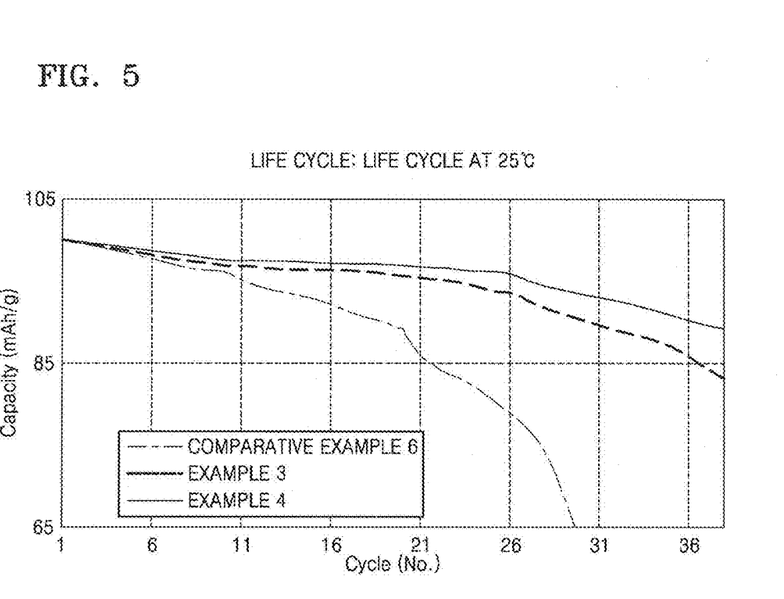
FIG. 5 is a graph illustrating lifespan characteristics of coin half cells prepared according to Examples 3 and 4 and Comparative Example 6.

Capacity retention rate (%)=[(discharge capacity per weight at $30^{th}$ cycle/discharge capacity per weight at $1^{st}$ cycle)]×100   Equation 2

TABLE 3

|  | Discharge capacity per weight at $1^{st}$ cycle | Discharge capacity per weight at $30^{th}$ cycle (mAh/g) | Capacity retention rate (%) |
|---|---|---|---|
| Example 3 | 173.1 | 153.9 | 92.8 |
| Example 4 | 179.5 | 167.8 | 96.3 |
| Comparative Example 6 | 175.9 | 96.0 | 83.5 |

Referring to Table 3 and FIG. 5, the coin half cells prepared as in Examples 3 and 4 each had a longer lifespan than the coin half-cell prepared as in Comparative Example 6.

Evaluation Example 2: Evaluation of High-Temperature Lifespan Characteristics and High-Temperature Storage Lifespan Characteristics The coin half cells prepared as in Examples 3 and 4 and Comparative Examples 7 to 9 were subjected to two cycles of charging and discharging at room temperature to perform a formation as in Evaluation Example 1.

After the formation, the coin half cells were charged at a rate of 0.5 C at room temperature as described above and discharged at a rate of 0.2 C until the voltage reached 2.8 V. These charging and discharging conditions were used (utilized) as reference conditions for charging and discharging, and a discharge capacity was measured and used (utilized) as a reference capacity.

Then, high-temperature capacity retention rates of each of the coin half cells prepared as in Examples 3 and 4 and Comparative Examples 7 to 9 were obtained by maintaining the coin half cells in a constant-temperature chamber at 60° C. for about 600 hours and obtaining a respective discharge capacity thereof. Then, discharge capacity during first charging and discharging was measured to calculate high-temperature capacity recovery rates thereof. The results are shown in Table 4 below. Here, high-temperature capacity retention rate (%) and high-temperature capacity recovery rate (%) were obtained using (utilizing) Equations 3 and 4, respectively.

High-temperature capacity retention rate (%)={(discharge capacity after maintaining in constant-temperature chamber at 60° C./reference capacity)×100}        Equation 3

High-temperature capacity recovery rate (%)={(discharge capacity during first charging and discharging after maintaining in constant-temperature chamber at 60° C./reference capacity)×100}        Equation 4

TABLE 4

|  | Reference capacity (mAh) | Discharge capacity after maintaining in constant-temperature chamber at 60° C. (mAh) | High-temperature capacity retention rate (%) | Discharge capacity during $1^{st}$ charging and discharging after maintaining in constant-temperature chamber at 60° C. (mAh) | High-temperature capacity recovery rate (%) |
|---|---|---|---|---|---|
| Example 3 | 198.8 | 167.3 | 84 | 177.3 | 89 |
| Example 4 | 196.3 | 163.8 | 83 | 173.6 | 88 |
| Comparative Example 7 | 193.2 | 148.7 | 77 | 158.7 | 82 |
| Comparative Example 8 | 215.2 | 175.8 | 82 | 188.1 | 87 |
| Comparative Example 9 | 197.7 | 159.6 | 81 | 170.7 | 86 |

Referring to Table 4, respective high-temperature capacity retention rates and high-temperature capacity recovery rates of the coin half cells prepared as in Examples 3 and 4 were greater than those of the coin half cells prepared as in Comparative Examples 7 to 9. Therefore, it may be confirmed that high-temperature lifespan characteristics and high-temperature storage lifespan characteristics of the coin half cells prepared as in Examples 3 and 4 were improved.

As described above, according to the one or more of the above embodiments of the present invention, the composite cathode active material includes the first coating layer including zirconium oxide on (e.g., formed on or directly on) at least one portion of the core and/or lithium iron phosphate between (e.g., formed between) the core and the first coating layer or on the first coating layer. Thus, a lithium battery including the composite cathode active material may have excellent electrochemical stability, (high-temperature) lifespan characteristics, and high-temperature storage lifespan characteristics.

It should be understood that the example embodiments described herein should be considered in a descriptive sense only and not for purposes of limitation. Descriptions of features or aspects within each embodiment should typically be considered as available for other similar features or aspects in other embodiments.

While certain embodiments of the present invention have been described with reference to the figures, it will be understood by those of ordinary skill in the art that various changes in form and details may be made therein without departing from the spirit and scope of the present invention as defined by the following claims, and equivalents thereof.

What is claimed is:

1. A composite cathode active material comprising:
   a core comprising a material capable of intercalation and deintercalation of lithium;
   a first coating layer on at least one portion of the core; and
   a second coating layer, the second coating layer being between the core and the first coating layer,
   wherein the first coating layer comprises zirconium oxide, and
   wherein the second coating layer comprises lithium iron phosphate.

2. The composite cathode active material of claim 1, wherein the first coating layer comprises zirconium oxide having a nano-sized average particle diameter.

3. The composite cathode active material of claim 1, wherein the second coating layer is formed from lithium remaining on the core.

4. The composite cathode active material of claim 1, wherein the core comprises a layer-structured lithium-transition metal oxide.

5. The composite cathode active material of claim 1, wherein the core comprises a lithium-transition metal oxide represented by Formula 1:

$$Li_a(Ni_xCo_yMe_z)_{2-a}O_2 \qquad \text{Formula 1}$$

wherein $0.5 \leq x \leq 1$, $0 \leq y \leq 0.5$, $0 < z \leq 0.5$, and $0.90 < a \leq 1.20$, and
Me is selected from aluminum (Al), manganese (Mn), titanium (Ti), and calcium (Ca).

6. The composite cathode active material of claim 1, wherein the core comprises $LiNi_pCo_qAl_rO_2$, and
wherein $0.5 \leq p \leq 0.92$, $0 < q \leq 0.2$, and $0 < r \leq 0.08$.

7. The composite cathode active material of claim 1, wherein the amount of lithium remaining on the core is less than 0.50% by weight, based on the total weight of the composite cathode active material.

8. The composite cathode active material of claim 1, wherein the amount of lithium remaining on the core is less than 0.40% by weight, based on the total weight of the composite cathode active material.

9. A lithium battery comprising:
   a cathode comprising a cathode active material;
   an anode comprising an anode active material;
   an electrolyte between the cathode and the anode,
   wherein the cathode active material comprises the composite cathode active material according to claim 1.